United States Patent
Zenzai

(10) Patent No.: US 12,482,601 B2
(45) Date of Patent: Nov. 25, 2025

(54) METHOD FOR MANUFACTURING CERAMIC ELECTRONIC CHIP COMPONENT

(71) Applicant: Murata Manufacturing Co., Ltd., Nagaokakyo (JP)

(72) Inventor: Kota Zenzai, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 137 days.

(21) Appl. No.: 18/122,154

(22) Filed: Mar. 16, 2023

(65) Prior Publication Data

US 2023/0230766 A1    Jul. 20, 2023

Related U.S. Application Data

(63) Continuation of application No. PCT/JP2021/032563, filed on Sep. 4, 2021.

(30) Foreign Application Priority Data

Sep. 25, 2020 (JP) ................. 2020-160733

(51) Int. Cl.
*H01G 4/12* (2006.01)
*H01G 4/008* (2006.01)
(Continued)

(52) U.S. Cl.
CPC .......... *H01G 4/1209* (2013.01); *H01G 4/008* (2013.01); *H01G 4/012* (2013.01); *H01G 4/232* (2013.01);
(Continued)

(58) Field of Classification Search
CPC ...... H01G 4/232; H01G 4/1209; H01G 4/008; H01G 4/012; H01G 4/12; H01G 4/2325; H01B 1/16
See application file for complete search history.

(56) References Cited

U.S. PATENT DOCUMENTS

2009/0139754 A1    6/2009   Ikarashi et al.
2013/0057112 A1*   3/2013   Shirakawa ............... H01G 4/12
                                                      336/200
(Continued)

FOREIGN PATENT DOCUMENTS

CN      101341557 A    1/2009
JP      2001118424 A   4/2001
(Continued)

OTHER PUBLICATIONS

Harper, C., "Resins for Embedding Microelectronic Devices," in IEEE Transactions on Component Parts, vol. 11, No. 1, pp. 22-27, Mar. 1964. (Year: 1964).*

(Continued)

*Primary Examiner* — A. Dexter Tugbang
(74) *Attorney, Agent, or Firm* — Keating & Bennett, LLP

(57) ABSTRACT

A method for manufacturing a ceramic electronic chip including an outer electrode including a glass-free sintered layer containing no glass. The method includes providing a glass-free conductive paste including a conductive metal powder and a thermosetting resin, the conductive metal powder including an alloy of tin and at least one of copper and nickel, and the glass-free conductive paste containing no glass, and applying this composition to cover a portion of a surface of a ceramic body. Then the ceramic body to which the glass-free conductive paste has been applied is subjected to a heat treatment at a temperature of about 600° C., higher than or equal to a temperature about 400° C. higher than the curing temperature of the thermosetting resin. By the heat treatment, little of the thermosetting resin remains, and the conductive metal powder is sintered to form a unified sintered metal body.

13 Claims, 5 Drawing Sheets

(51) Int. Cl.
*H01G 4/012* (2006.01)
*H01G 4/232* (2006.01)
*H01B 1/16* (2006.01)

(52) U.S. Cl.
CPC ............ *H01B 1/16* (2013.01); *H01G 4/12* (2013.01); *H01G 4/2325* (2013.01)

(56) References Cited

U.S. PATENT DOCUMENTS

| | | | |
|---|---|---|---|
| 2013/0106560 A1* | 5/2013 | Zenzai | H01G 4/008 361/321.1 |
| 2015/0279563 A1* | 10/2015 | Otani | H01G 4/008 361/301.4 |
| 2015/0279566 A1* | 10/2015 | Otani | H01G 4/008 361/301.4 |
| 2016/0020028 A1 | 1/2016 | Katsuta | |
| 2016/0276303 A1* | 9/2016 | Inaba | H01G 4/2325 |
| 2017/0032896 A1 | 2/2017 | Otani | |
| 2018/0233289 A1 | 8/2018 | Nagai et al. | |

FOREIGN PATENT DOCUMENTS

| | | | | |
|---|---|---|---|---|
| JP | 2002367849 A | | 12/2002 | |
| JP | 2009099443 A | | 5/2009 | |
| JP | 2009283744 A | | 12/2009 | |
| JP | 2010123647 A | * | 6/2010 | |
| JP | 2013118358 A | | 6/2013 | |
| JP | 2015109411 A | | 6/2015 | |
| JP | 2016072485 A | | 5/2016 | |
| JP | 2017034010 A | | 2/2017 | |
| JP | 2018063998 A | | 4/2018 | |
| JP | 2018067568 A | * | 4/2018 | ........... H01G 13/006 |
| KR | 20190008406 A | | 1/2019 | |
| WO | 2007072894 A1 | | 6/2007 | |

OTHER PUBLICATIONS

Machine Translation of WO 2007/072894, Mar. 2025. (Year: 2025).*
Official Communication issued in corresponding Chinese Patent Application No. 202180063632.0, mailed on Sep. 19, 2024, 11 pages.
Zenzai, "Ceramic Electronic Chip Component and Method for Manufacturing the Same", U.S. Appl. No. 18/932,842, filed Oct. 31, 2024.
International Search Report in PCT/JP2021/032563, mailed Nov. 22, 2021, 3 pages.
Written Opinion in PCT/JP2021/032563, mailed Nov. 22, 2021, 4 pages.
Office Action in KR10-2023-7009157, mailed May 27, 2024, 5 pages.

* cited by examiner

METHOD FOR MANUFACTURING CERAMIC ELECTRONIC CHIP COMPONENT

CROSS REFERENCE TO RELATED APPLICATIONS

This application claims the benefit of priority to Japanese Patent Application No. 2020-160733 filed on Sep. 25, 2020 and is a Continuation Application of PCT Application No. PCT/JP2021/032563 filed on Sep. 4, 2021. The entire contents of each application are hereby incorporated herein by reference.

BACKGROUND OF THE INVENTION

1. Field of the Invention

The present invention relates to a ceramic electronic chip component and a method for manufacturing the same, and in particular, to a structure of an outer electrode on a surface of a ceramic body included in a ceramic electronic chip component and a method for forming an outer electrode.

2. Description of the Related Art

A problem that a ceramic electronic chip component, such as a multilayer ceramic capacitor, may encounter is the formation of cracks in a ceramic body due to the fact that the stress caused by the deflection of a substrate on which a ceramic electronic chip component is surface-mounted or the stress caused by heat applied in a solder reflow process used to mount the ceramic electronic chip component is applied to the ceramic body serving as the main body of the ceramic electronic chip component. Cracking the ceramic body not only impairs the function of the ceramic electronic chip component, but can also cause serious problems such as electrical short-circuits.

As a countermeasure to the problem, it has been reported that what is called a resin electrode is used as an outer electrode of a ceramic electronic chip component, the resin electrode containing a conductive metal powder and a thermosetting resin, but containing no glass, the electrode being formed by thermally curing the thermosetting resin. When the resin electrode are used, the following structures are used: (1) a structure in which a glass-containing sintered layer formed by applying a glass-containing conductive paste containing a conductive metal powder and glass frit to a surface of a ceramic body and sintering the paste is formed as an underlying layer so as to be in contact with an inner conductor partially exposed on the surface of the ceramic body, and a resin electrode is formed thereon; and (2) a structure in which a resin electrode is formed on a surface of a ceramic body so as to be in direct contact with an inner electrode.

In any of the above structures (1) and (2), the stress that can cause cracks in the ceramic body is first absorbed by delamination starting from the resin electrode or by the fracture of the resin electrode itself. This enables the prevention of the formation of cracks in the ceramic body.

The above structure (1) is described in, for example, Japanese Unexamined Patent Application Publication No. 2015-109411.

The above structure (2) is described in, for example, Japanese Unexamined Patent Application Publication No. 2009-283744, which discloses that when a conductive paste containing a conductive metal powder and a thermosetting resin is applied to a surface of a ceramic body and then the conductive paste is cured by heat treatment, the maximum temperature is set near the temperature at which the carbonization of the thermosetting resin is initiated. Japanese Unexamined Patent Application Publication No. 2015-109411 states that setting the maximum temperature at the time of curing in this way facilitates the metal diffusion between the conductive metal powder in the resin electrode and the metal of the inner conductor while the denseness of the resin electrode is maintained, thereby ensuring the electrical connection between the resin electrode and the inner conductor, reducing a deterioration in insulation resistance in a high-temperature and high-humidity environment, and reducing variations in electrostatic capacitance when the structure is used for a multilayer ceramic capacitor.

SUMMARY OF THE INVENTION

The resin electrode, however, has a relatively high electrical resistance because its conductivity is obtained by dispersing a conductive metal powder in a thermosetting resin, and thus the ceramic electronic chip component tends to have a high equivalent series resistance (ESR). In particular, ESR in the above structure (1) is higher than that in the structure (2) because of the presence of glass on the surface layer of the glass-containing sintered layer serving as an underlying layer.

Preferred embodiments of the present invention provide ceramic electronic chip components each including an electrode layer with a lower electrical resistance than a resin electrode or a glass-containing sintered layer at an outer electrode while maintaining the function of protecting a ceramic body from cracking due to stress caused by the deflection of a substrate or heat in a solder reflow process, and a method for manufacturing such a ceramic electronic chip component.

A preferred embodiment of the present invention is directed to a method for manufacturing a ceramic electronic chip component. The ceramic electronic chip component manufactured by the manufacturing method according to a preferred embodiment of the present invention includes a ceramic body including an inner conductor and a portion of the inner conductor exposed on a surface of the ceramic body and an outer electrode electrically coupled to the inner conductor and covering a portion of the surface of the ceramic body.

To manufacture the ceramic electronic chip component described above, providing a ceramic body, providing a conductive paste to be formed into at least a portion of the outer electrode, applying the conductive paste to cover a portion of the surface of the ceramic body, and performing heat treatment of the ceramic body to which the conductive paste has been applied are conducted.

To solve the above-mentioned technical problems, preferred embodiments of the present invention may include the following configuration.

The outer electrode includes a glass-free sintered layer containing no glass. The providing the conductive paste includes providing a glass-free conductive paste including a conductive metal powder including an alloy of tin and at least one of copper and nickel, and a thermosetting resin, the glass-free conductive paste containing no glass. The applying the conductive paste includes applying the glass-free conductive paste to cover a portion of the surface of the ceramic body. The performing heat treatment of the ceramic body includes performing heat treatment of the ceramic body to which the glass-free conductive paste has been applied at a temperature higher than or equal to a temperature about 400° C. higher than the curing temperature of the thermosetting resin to form the glass-free sintered layer.

A preferred embodiment of the present invention is also directed to a ceramic electronic chip component obtained by performing the manufacturing method described above.

The ceramic electronic chip component according to a preferred embodiment of the present invention includes a ceramic body including an inner conductor and a portion of the inner conductor exposed on a surface of the ceramic body and an outer electrode electrically coupled to the inner conductor and covering a portion of the surface of the ceramic body. The outer electrode includes a glass-free sintered layer including an alloy of tin and at least one of copper and nickel, the glass-free sintered layer containing no glass, and the glass-free sintered layer includes a thermosetting resin in an area fraction of about 1% or less in a cross section of the glass-free sintered layer.

According to a preferred embodiment of the present invention, the outer electrode of the ceramic electronic chip component includes the glass-free sintered layer. The glass-free sintered layer can have a lower electrical resistance than a resin-containing conductive layer including a conductive metal powder and a thermosetting resin. Unlike the glass-containing sintered layer formed by firing a conductive paste including a conductive metal powder and a glass, there is no glass precipitation on a surface layer of the glass-free sintered layer. Thus, ESR can be reduced, compared to a ceramic electronic chip component in which the main portion of an outer electrode is composed of only a resin-containing conductive layer or a glass-containing sintered layer.

Even when the stress caused by the deflection of a substrate on which a ceramic electronic chip component is surface-mounted or the stress caused by heat applied in a solder reflow process used to mount the ceramic electronic chip component is applied to the ceramic body, the stress can be absorbed by delamination starting from the glass-free sintered layer or by the fracture of the glass-free sintered layer itself. This enables the prevention of the formation of cracks in the ceramic body.

According to preferred embodiments of the present invention, it was discovered that the use of the conductive paste including the conductive metal powder including the alloy of tin and at least one selected from copper and nickel in order to form the glass-free sintered layer in the outer electrode results in the glass-free sintered layer having high denseness.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
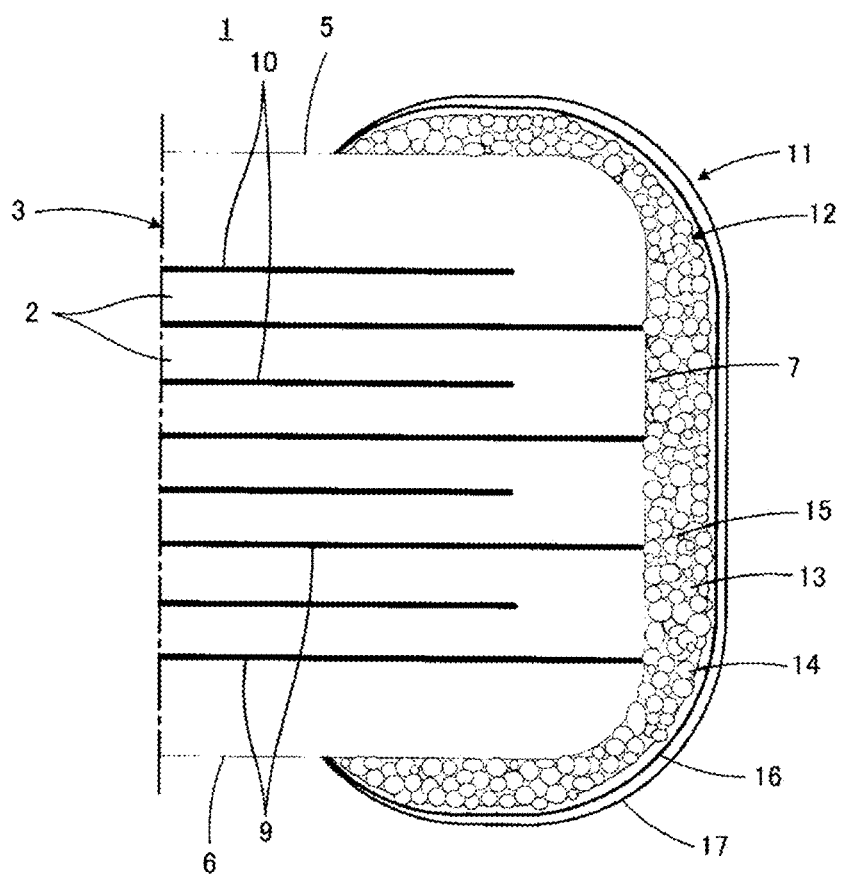
FIG. 1 is a cross-sectional view schematically illustrating a portion of a multilayer ceramic capacitor 1 as a ceramic electronic chip component according to a first preferred embodiment of the present invention.

In the description of a ceramic electronic chip components according to preferred embodiments of the present invention, a multilayer ceramic capacitor is used as an example of the ceramic electronic chip component.

First Preferred Embodiment

A multilayer ceramic capacitor 1 as a ceramic electronic chip component according to a first preferred embodiment of the present invention will be described below with reference to FIG. 1.

The multilayer ceramic capacitor 1 includes a ceramic body 3 in which multiple ceramic layers 2 including a dielectric ceramic material are laminated. The ceramic body 3 includes a first main surface 5 and a second main surface 6 opposite each other, a first end surface 7 connecting them, a second end surface, not illustrated, opposite the first end surface 7, and a first side surface and a second side surface, not illustrated, that extend parallel to the paper plane of FIG. 1 and that are opposite each other.

Multiple first inner electrodes 9 and multiple second inner electrodes 10 serving as inner conductors are alternately arranged inside the ceramic body 3 in the lamination direction of the ceramic layers 2 with the specific ceramic layer 2 interposed between adjacent inner electrodes. The first inner electrodes 9 extend to the first end surface 7. An end edge of each of the first inner electrodes 9 is exposed at a surface of the ceramic body 3. The second inner electrodes 10 extend to the second end surface, which is not illustrated in the figure. An end edge of each of the second inner electrodes 10 is exposed at a surface of the ceramic body 3. The inner electrodes 9 and 10 include a conductive component, such as nickel.

The outer electrode illustrated, i.e., a first outer electrode 11, is disposed on the first end surface 7, which is part of the surface of the ceramic body 3, and electrically coupled to the first inner electrodes 9. A second outer electrode, which is not illustrated in the figure, opposite the first outer electrode 11 is disposed on the second end surface, which is part of the surface of the ceramic body 3, and electrically coupled to the second inner electrodes 10. The first outer electrode 11 and the second outer electrode have substantially the same structure. Thus, the structure of the first outer electrode 11 will be described in detail below, and the description of the structure of the second outer electrode is omitted.

The first outer electrode 11 extends from the first end surface 7 to portions of the first and second main surfaces 5 and 6 and the first and second side surfaces adjacent to the first end surface 7. The outer electrode 11 is basically formed by performing a step of providing a conductive paste to be formed into at least a portion of the outer electrode, a step of applying the conductive paste to cover a portion of the surface of the ceramic body 3, and a step of performing heat treatment of the ceramic body 3 to which the conductive paste has been applied.

Here, the ceramic body 3 has already been sintered, and the step of performing heat treatment of the ceramic body 3 to which the conductive paste has been applied is not for sintering the ceramic body 3, i.e., it is not for co-sintering the conductive paste and the ceramic body 3. This heat treatment is exclusively for sintering or curing the conductive paste.

In this preferred embodiment, the outer electrode 11 includes a glass-free sintered layer 12 that includes an alloy of tin and at least one of copper and nickel and that contains no glass. The glass-free sintered layer 12 is formed on a portion of the surface of the ceramic body 3, i.e., the end surface 7, while in contact with the inner electrodes 9. To form the glass-free sintered layer 12, the step of providing the conductive paste includes a step of providing a glass-free conductive paste including a conductive metal powder and a thermosetting resin, the conductive metal powder being including an alloy of tin and at least one of copper and nickel, and the conductive paste containing no glass.

As the conductive metal powder including the alloy of tin and at least one of copper and nickel, a copper·tin alloy powder, a nickel·tin alloy powder, a copper·nickel·tin alloy powder, or a powder mixture of at least two of these alloy powders may be used.

The particles of the conductive metal powder may be spherical or plate shaped. The conductive metal powder used advantageously has a small particle size of, for example, about 0.1 µm to about 1.0 µm in terms of D50 measured by a laser diffraction/scattering method. As can be seen from the experimental examples described below, when an alloy of copper and tin is used as the conductive metal powder, the alloy preferably has a tin content of about 2% or more by mass and about 15% or less by mass.

Examples of the thermosetting resin that can be used include bisphenol A-type epoxy resins, resol-type phenolic resins, and novolac-type phenolic resins.

To the thermosetting resin, for example, a solvent, such as diethylene glycol monobutyl ether or diethylene glycol monoethyl ether, is added.

The conductive metal powder preferably accounts for about 50% to about 65% by volume of the total of the conductive metal powder and the thermosetting resin (excluding the solvent), for example.

The step of applying the conductive paste includes a step of applying, by a dipping method or the like, the glass-free conductive paste to cover a portion of the surface of the ceramic body 3, i.e., the end surface 7, and to be in contact with the inner electrodes 9. After the application of the glass-free conductive paste, the paste is dried, for example, at about 150° C. The coating thickness on the end surface 7 of the ceramic body 3 is about 5 µm to about 30 µm after drying, for example. The reason why the coating thickness is in a wide range of about 5 µm to about 30 µm, for example, is that the coating thickness may vary among the multiple ceramic bodies 3 and that the coating thickness on the end surface 7 of one ceramic body 3 may vary from place to place.

The step of performing heat treatment of the ceramic body 3 includes a step of performing heat treatment of the ceramic body 3 to which the glass-free conductive paste has been applied at a temperature higher than or equal to a temperature about 400° C. higher than the curing temperature of the thermosetting resin to form the glass-free sintered layer 12. When the curing temperature of the thermosetting resin is about 180° C., the heat treatment is performed at a temperature of about 580° C. or higher, for example, about 600° C. The upper limit of the heat-treatment temperature is a temperature that does not adversely affect the ceramic body 3 and is preferably, for example, about 950° C.

As illustrated in FIG. 1, the glass-free sintered layer 12 obtained as described above includes a sintered metal body 13 in which a conductive metal powder 14 is partially unified while retaining its original powder shape. The glass-free sintered layer 12 has sufficient adhesion to the ceramic body 3. In the case where the inner electrodes 9 include nickel and where the sintered metal body 13 includes a copper·tin alloy, nickel in the inner electrodes 9 and the copper·tin alloy in the glass-free sintered layer 12 form a bonding layer between the inner electrodes 9 and the glass-free sintered layer 12 to achieve a highly reliable bonding state. As illustrated in FIG. 1, the inside of the sintered metal body 13 may be dotted with carbon 15 originating from the thermosetting resin.

For example, when the conductive metal powder included in the glass-free conductive paste is a copper·tin alloy powder, the sintered metal body 13 includes a copper-tin alloy. When the conductive metal powder is a nickel·tin alloy powder, the sintered metal body 13 includes the nickel·tin alloy.

The glass-free conductive paste provided to form the glass-free sintered layer 12 contains no glass; thus, the glass-free sintered layer 12 contains no glass. Unlike a glass-containing sintered layer, glass, which inhibits electrical continuity, is not precipitated on the surface layer, thus eliminating the cause of an increase in ESR of the multilayer ceramic capacitor 1.

The presence of the carbon 15 originating from the thermosetting resin and the absence of glass can be determined, for example, by producing a cross section of the multilayer ceramic capacitor 1 using, for example, ion milling and conducting mapping analysis using SEM-EDX. That is, when the mapping analysis is conducted with SEM-EDX, the carbon 15 originating from the thermosetting resin is detected inside the sintered metal body 13, and a glass component including Si and B is not detected.

Although the glass-free conductive paste includes the thermosetting resin, the above-described heat treatment at a temperature higher than or equal to a temperature about 400° C. higher than the curing temperature of the thermosetting resin enables the thermal decomposition or combustion of the thermosetting resin. Thereby, no or very little of the thermosetting resin can be left in the glass-free sintered layer 12. More specifically, the glass-free sintered layer 12 includes the thermosetting resin and has a thermosetting resin content of about 1% or less in terms of the area fraction in a cross section of the glass-free sintered layer 12.

The heat-treatment time and the oxygen concentration in the heat-treatment atmosphere are appropriately adjusted so as to provide the above-mentioned state in the glass-free sintered layer 12.

Figure 5:
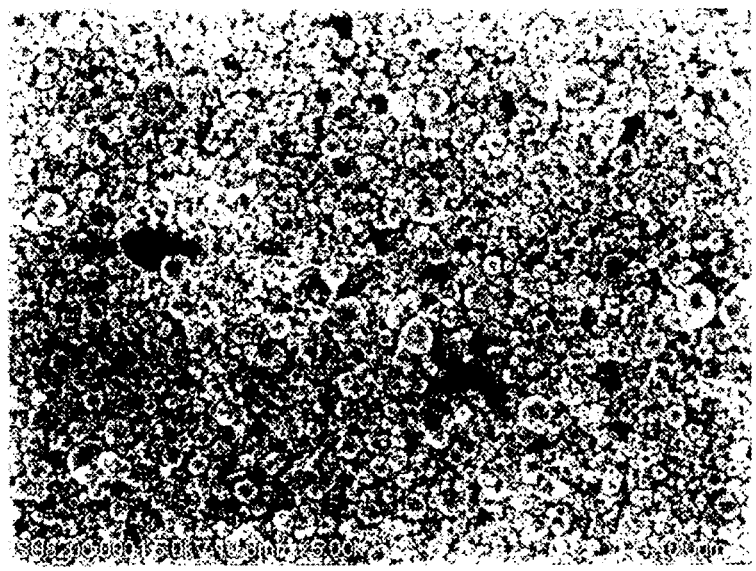
FIG. 5 illustrates an electron micrograph of a surface of a glass-free sintered layer according to an example, the layer being formed by sintering a conductive paste including a copper-tin alloy powder as a conductive metal powder.
Figure 6:
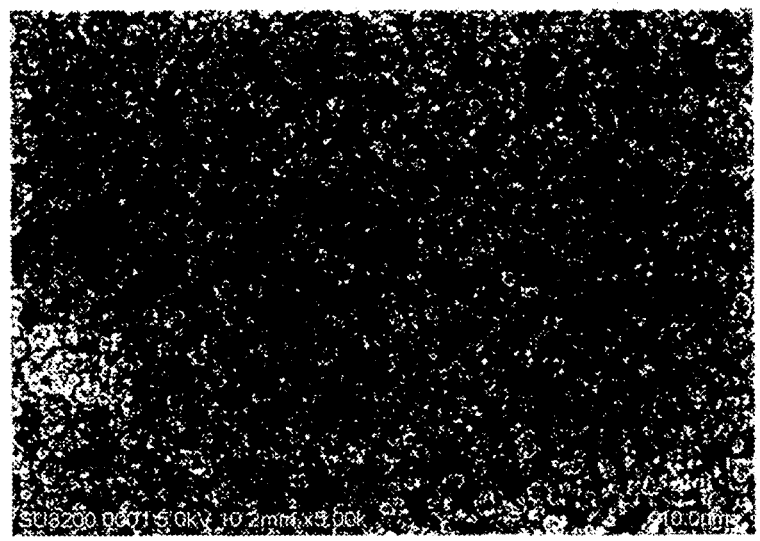
FIG. 6 illustrates an electron micrograph of a surface of a glass-free sintered layer according to a comparative example, in which a conductive paste used for forming the glass-free sintered layer includes a conductive metal powder including a mixture of a copper powder and a tin powder, instead of a copper-tin alloy powder.

FIG. 5 illustrates an electron micrograph of a surface of a glass-free sintered layer according to an example, the glass-free sintered layer being produced by sintering a conductive paste including, as a conductive metal powder, a copper·tin alloy powder that includes about 15% by mass of tin. FIG. 6 illustrates an electron micrograph of a surface of a glass-free sintered layer according to a comparative example in which a conductive metal powder obtained by mixing a copper powder and a tin powder at a mass ratio of about 85:15 is included in the conductive paste used for forming the glass-free sintered layer, instead of the copper·tin alloy powder.

A comparison between FIGS. 5 and 6 reveals that the glass-free sintered layer according to the example illustrated in FIG. 5 has higher denseness than the glass-free sintered layer according to the comparative example illustrated in FIG. 6. In the comparative example illustrated in FIG. 6, as described above, the powder of elemental copper and the powder of elemental tin are mixed, instead of the alloy powder. Thus, it is presumed that in the heating process of the conductive paste for forming the glass-free sintered layer, the tin powder having a relatively low melting point moved, and the place where the tin powder was located before the movement remained as voids, thus causing a decrease in denseness. Such voids may lead to the formation of an entry path for a liquid, such as water or a plating solution, or water vapor, thereby deteriorating the weather resistance of a ceramic electronic chip component, such as a multilayer ceramic capacitor.

The above tendency is also observed when a nickel powder is used together with the tin powder instead of the copper powder.

In contrast, as compared with the case where the powder of elemental copper or a powder of elemental nickel and the powder of elemental tin are present, in the case of the powder including the alloy of tin and at least one of copper and nickel, sinterability is improved, adjacent particles in the powder can coalesce efficiently together, and partial over-sintering is less likely to occur. In the heating process of the conductive paste for forming the glass-free sintered layer, the phenomenon in which the tin powder having a relatively low melting point moves to result in the formation of voids is less likely to occur. Accordingly, in the example illustrated in FIG. 5, high denseness is obtained in the glass-free sintered layer.

As described above, in the glass-free sintered layer formed by heat-treating the conductive paste including the powder including the alloy of tin and at least one of copper and nickel, cracks due to over-sintering can be made less likely to form, and voids due to movement of the tin powder can also be made less likely to form. Thus, in the glass-free sintered layer, an entry path for a liquid, such as water or a plating solution, or water vapor can be made less likely to form, thus enabling an improvement in the reliability of a ceramic electronic chip component, such as a multilayer ceramic capacitor.

As described above, in the process of heating the conductive paste for forming the glass-free sintered layer, the tin powder having a relatively low melting point may move to cause a disadvantageous phenomenon, such as formation of voids. However, this does not completely preclude the incorporation of a small amount of powder of elemental copper, powder of elemental nickel, or powder of elemental tin in the conductive paste. For example, the incorporation of an appropriate amount of powder of elemental tin in addition to a powder including an alloy of nickel and tin can make partial over-sintering less likely to occur.

As described above, the use of an alloy powder having a small particle size of, for example, about 0.1 µm to about 1.0 µm in terms of D50 further improves sinterability and can make over-sintering much less likely to occur.

Next, as illustrated in FIG. 1, a nickel plating film 16 is formed so as to cover the outer electrode 11 including the glass-free sintered layer 12, and then a tin plating film 17 is formed thereon.

As a modification of the first preferred embodiment described above, in order to form the glass-free sintered layer 12, the ceramic body 3 to which the glass-free conductive paste has been applied may be heat-treated at a temperature of, for example, about 800° C., which is higher than about 600° C. described above. In this case, the glass-free sintered layer 12 is mostly including the sintered metal body 13 in which the conductive metal powder 14 is sintered into one piece. That is, the glass-free sintered layer 12 retains little or none of the original powder shape of the conductive metal powder 14.

Second Preferred Embodiment

Figure 2:
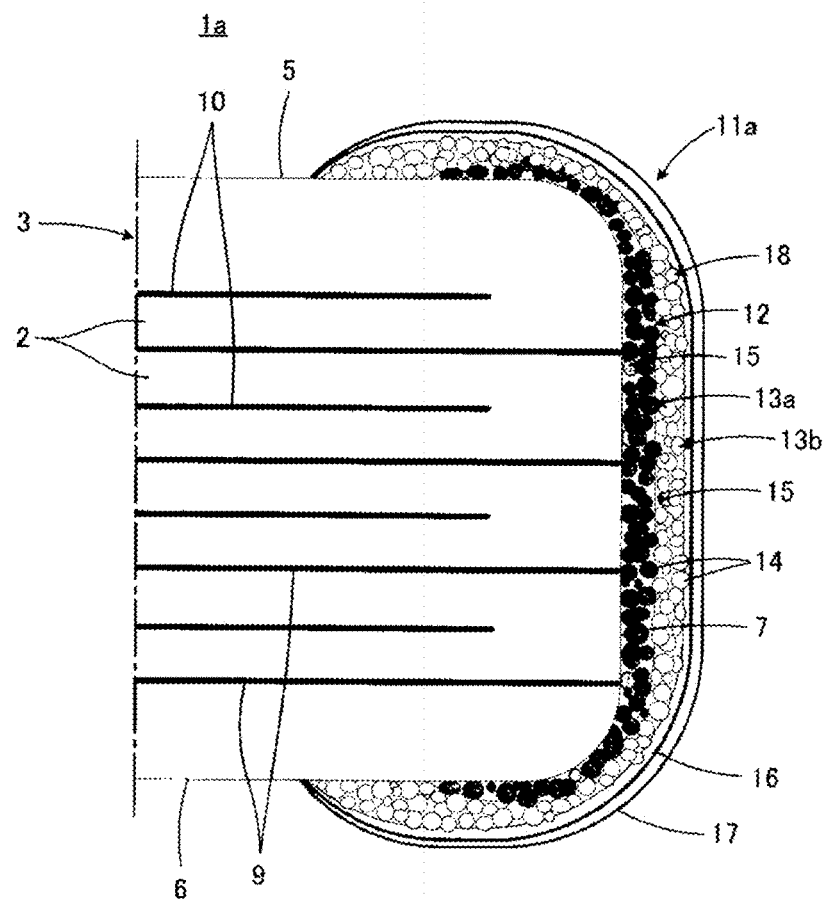
FIG. 2 is a cross-sectional view schematically illustrating a portion of a multilayer ceramic capacitor 1a as a ceramic electronic chip component according to a second preferred embodiment of the present invention.

FIG. 2 is a cross-sectional view schematically illustrating a portion of a multilayer ceramic capacitor 1a as a ceramic electronic chip component according to a second preferred embodiment of the present invention. In FIG. 2, elements corresponding to those illustrated in FIG. 1 are designated by like reference numerals, and redundant descriptions are not repeated.

The following describes the different points of the second preferred embodiment from the first preferred embodiment.

The multilayer ceramic capacitor 1a is characterized in that when the above-mentioned glass-free sintered layer 12 is defined as a first glass-free sintered layer 12, an outer electrode 11a further includes a second glass-free sintered layer 18 containing no glass, the second glass-free sintered layer 18 being disposed on the first glass-free sintered layer 12.

To form the outer electrode 11a as described above, the following conductive pastes are provided: a first glass-free conductive paste for the first glass-free sintered layer 12, the first glass-free conductive paste including a first conductive metal powder and a first thermosetting resin, the first conductive metal powder being including an alloy of tin and at least one of copper and nickel, and the first glass-free conductive paste containing no glass, and in addition, a second glass-free conductive paste including a second conductive metal powder and a second thermosetting resin, the second conductive metal powder being including an alloy of tin and at least one of copper and nickel, and the second glass-free conductive paste containing no glass. The second glass-free conductive paste may have the same composition as the first glass-free conductive paste. In this case, it should be possible to reduce the cost of the glass-free conductive paste and simplify the production control.

A step of applying the first glass-free conductive paste and performing drying at, for example, about 150° C. is conducted. The coating thickness after drying is about 5 µm to about 30 µm, for example. To form the first glass-free sintered layer 12, a step of performing heat treatment of the ceramic body 3 at a temperature higher than or equal to a temperature about 400° C. higher than the curing temperature of the thermosetting resin is conducted. A specific heat-treatment temperature will be described below.

After the formation of the first glass-free sintered layer 12, a step of applying the second glass-free conductive paste onto the first glass-free sintered layer 12 and performing drying at, for example, about 150° C. is conducted. The coating thickness after drying is selected to be, for example, about 10 µm to about 40 µm at a portion covering the end surface 7 of the ceramic body 3.

The ceramic body 3 to which the second glass-free conductive paste has been applied is subjected to heat treatment, thus forming the second glass-free sintered layer 18. At this time, the second glass-free sintered layer 18 is formed so as to have a lower degree of sintering than the first glass-free sintered layer 12. More specifically, the ceramic body 3 to which the second glass-free conductive paste has been applied is subjected to heat treatment at a second temperature that is a temperature higher than or equal to a temperature about 400° C. higher than the curing temperature of the second thermosetting resin and that is lower than a first temperature at which the first glass-free sintered layer 12 has been sintered.

As an example, a temperature of, for example, about 650° C. is used to sinter the first glass-free sintered layer 12, and a temperature of, for example, about 600° C. is used to sinter the second glass-free sintered layer 18.

Thereby, the first glass-free sintered layer 12 includes a sintered metal body 13a in which the conductive metal powder 14 is partially unified while retaining its original powder shape. Similarly, the second glass-free sintered layer 18 includes a sintered metal body 13b in which the conductive metal powder 14 is partially unified while retaining its original powder shape. However, the second glass-free sintered layer 18 has a low degree of sintering, compared with that of the first glass-free sintered layer 12. In other words, the first glass-free sintered layer 12 has a high degree of sintering, compared with that of the second glass-free sintered layer 18.

The inside of the sintered metal bodies 13a and 13b may be dotted with carbon 15 originating from the thermosetting resin, as illustrated in FIG. 2.

As with the case of the first preferred embodiment, the nickel plating film 16 is formed so as to cover the outer electrode 11a. More specifically, as illustrated in FIG. 2, the nickel plating film 16 is formed on the second glass-free sintered layer 18, and the tin plating film 17 is formed thereon.

The second preferred embodiment is advantageously used when the thicknesses of the outer electrode 11a is intended to be increased.

Third Preferred Embodiment

Figure 3:
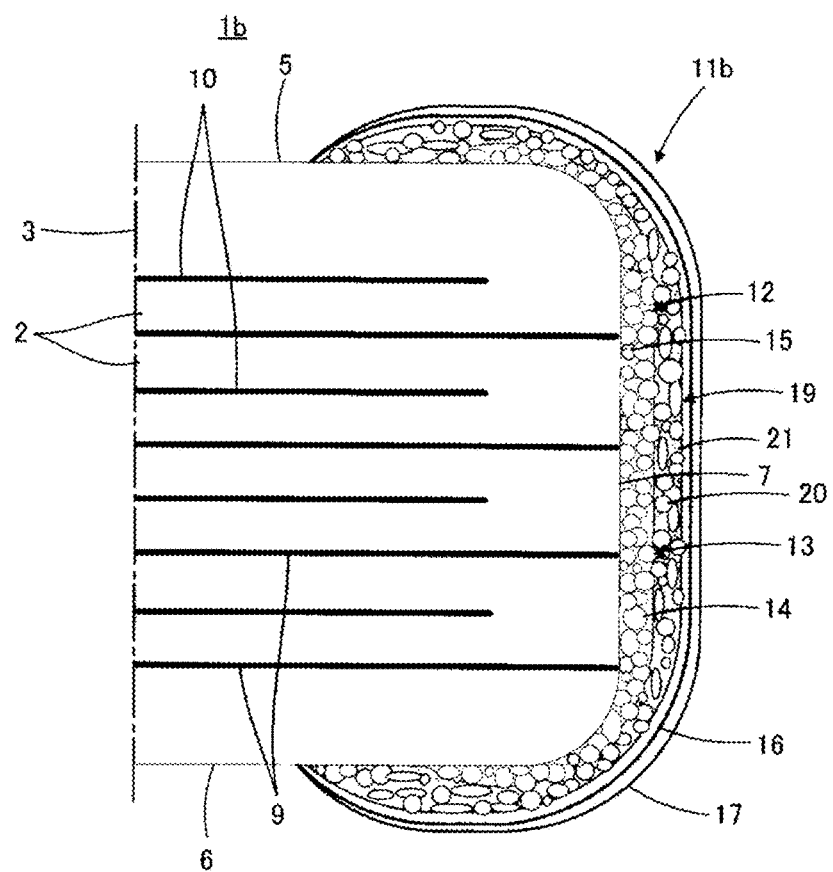
FIG. 3 is a cross-sectional view schematically illustrating a portion of a multilayer ceramic capacitor 1b as a ceramic electronic chip component according to a third preferred embodiment of the present invention.

FIG. 3 is a cross-sectional view schematically illustrating a portion of a multilayer ceramic capacitor 1b as a ceramic electronic chip component according to a third preferred embodiment of the present invention. In FIG. 3, elements corresponding to those illustrated in FIG. 1 are designated by like reference numerals, and redundant descriptions are not repeated.

The following describes the different points of the third preferred embodiment from the first preferred embodiment.

The multilayer ceramic capacitor 1b is characterized in that an outer electrode 11b further includes a resin-containing conductive layer 19 disposed on the glass-free sintered layer 12.

To form the outer electrode 11b as described above, a third glass-free conductive paste is provided as a conductive paste, the third glass-free conductive paste including a conductive metal powder and a thermosetting resin and containing no glass. As the conductive metal powder and the thermosetting resin included in the third glass-free conductive paste, the same conductive metal powder and thermosetting resin as those included in the glass-free conductive paste provided in the first preferred embodiment can be used. The third glass-free conductive paste may further include a curing catalyst.

As described in the first preferred embodiment, after the formation of the glass-free sintered layer 12, a step of applying the third glass-free conductive paste onto the glass-free sintered layer 12 and performing drying at, for example, about 150° C. is conducted. The coating thickness after drying is selected to be, for example, about 10 μm to about 40 μm at a portion covering the end surface 7 of the ceramic body 3.

The ceramic body 3 to which the third glass-free conductive paste has been applied is subjected to heat treatment, for example, at about 200° C. to heat-cure the thermosetting resin included in the third glass-free conductive paste, thus forming the resin-containing conductive layer 19 on the glass-free sintered layer 12. As illustrated in FIG. 3, the resin-containing conductive layer 19 includes a thermosetting resin 21 in which a conductive metal powder 20 is dispersed.

As with the case of the first preferred embodiment, the nickel plating film 16 is formed so as to cover the outer electrode 11b. More specifically, as illustrated in FIG. 3, the nickel plating film 16 is formed on the resin-containing conductive layer 19, and the tin plating film 17 is formed thereon.

Fourth Preferred Embodiment

Figure 4:
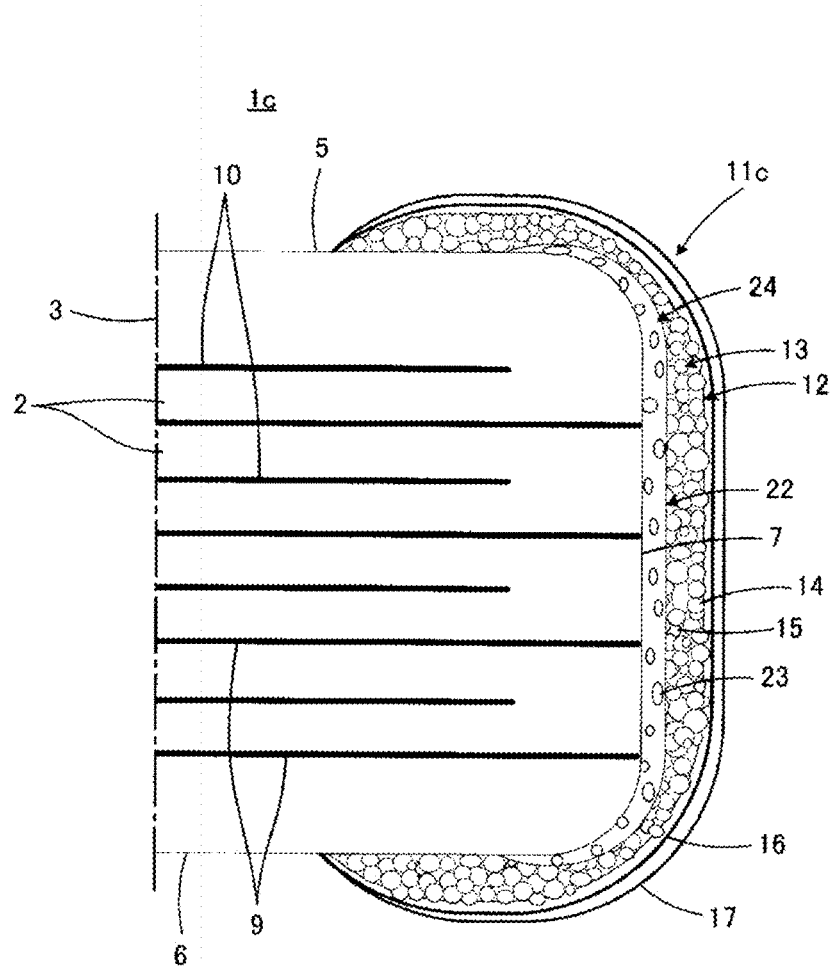
FIG. 4 is a cross-sectional view schematically illustrating a portion of a multilayer ceramic capacitor 1c as a ceramic electronic chip component according to a fourth preferred embodiment of the present invention.

FIG. 4 is a cross-sectional view schematically illustrating a portion of a multilayer ceramic capacitor 1c as a ceramic electronic chip component according to a fourth preferred embodiment of the present invention. In FIG. 4, elements corresponding to those illustrated in FIG. 1 are designated by like reference numerals, and redundant descriptions are not repeated.

The following describes the different points of the fourth preferred embodiment from the first preferred embodiment.

The multilayer ceramic capacitor 1c is characterized in that an outer electrode 11c further includes a glass-containing sintered layer 22 disposed on the ceramic body 3 and the glass-free sintered layer 12 is disposed on the glass-containing sintered layer 22.

To form the outer electrode 11c as described above, a glass-containing conductive paste that will be formed into the glass-containing sintered layer 22 and that includes a conductive metal powder and a glass is provided as a conductive paste. As the conductive metal powder included in the glass-containing conductive paste, for example, a conductive metal powder including copper is used. The glass-containing conductive paste further includes a resin component.

The glass-containing conductive paste is applied onto the end surface 7 of the ceramic body 3 while in contact with the inner electrodes 9.

The ceramic body 3 to which the glass-containing conductive paste has been applied is subjected to heat treatment. This results in the formation of the glass-containing sintered layer 22 in which the conductive metal powder is sintered with the glass included. In the glass-containing sintered layer 22, a sintered metal body 24 including a glass 23 is formed.

A glass-free conductive paste including a conductive metal powder including an alloy of tin and at least one of copper and nickel, similar to that used in the first preferred embodiment, is applied onto the glass-containing sintered layer 22 to a thickness of, for example, about 10 μm to about 40 μm after drying, dried at about 150° C., and then subjected to heat treatment at a temperature of, for example, about 600° C. to form the glass-free sintered layer 12. When the heat-treatment temperature is used, as with the case of the glass-free sintered layer 12 in the first preferred embodiment, the glass-free sintered layer 12 includes both of the carbon 15 originating from the thermosetting resin and the sintered metal body 13 in which the conductive metal powder 14 is partially unified while retaining its original shape.

The nickel plating film 16 is formed on the glass-free sintered layer 12 so as to cover the outer electrode 11c formed in this way, and the tin plating film 17 is formed thereon.

EXPERIMENTAL EXAMPLES

Glass-free conductive pastes for samples 1 to 5 were provided, the pastes each including a conductive metal powder including an alloy of copper and tin or a conductive metal powder including an alloy of nickel and tin in proportions given in Table 1 below, a bisphenol A-type epoxy resin as a thermosetting resin, and diethylene glycol monoethyl ether as a solvent. Here, the conductive metal powder content of the glass-free conductive paste of each of samples 1 to 5 is about 60% by volume.

TABLE 1

| | | Sample No. | | | | | |
|---|---|---|---|---|---|---|---|
| | | 1 | 2 | 3 | 4 | | 5 |
| Percentage by mass of alloy component | Copper | 98 | 95 | 90 | 85 | Nickel | 85 |
| | Tin | 2 | 5 | 10 | 15 | Tin | 15 |
| Composition of conductive paste (% by mass) | | | | | | | |
| Alloy powder | | 67.7 | 67.6 | 67.5 | 67.4 | | 67.3 |
| Bisphenol A-type epoxy resin | | 6.0 | 6.1 | 6.1 | 6.2 | | 6.2 |
| diethylene glycol monoethyl ether | | 26.3 | 26.3 | 26.4 | 26.4 | | 26.5 |
| Adhesion of outer electrode | | | | | | | |
| Connection to inner electrode | | ○ | ○ | ○ | ○ | | ○ |
| Adhesion to ceramic body | | ○ | ○ | ○ | ○ | | ○ |
| Sintering in outer electrode | | ○ | ○ | ○ | ○ | | ○ |
| Moisture resistance load reliability | | ○ | ○ | ○ | ○ | | ○ |

Ceramic bodies for multilayer ceramic capacitors having an electrostatic capacitance of about 0.010 μF at a rated voltage of about 50 V were provided, the ceramic bodies each having a planar dimension of about 1.0 mm×about 0.5 mm and including inner electrodes including nickel as a conductive component. The glass-free conductive pastes for samples 1 to 5 were applied to the end surfaces of the respective ceramic bodies and dried at about 150° C. for about 5 minutes in a hot-air oven.

The ceramic bodies to which the glass-free conductive pastes had been applied were subjected to heat treatment in a firing furnace at about 600° C. to form glass-free sintered layers serving as outer electrodes. Here, the heat-treatment atmosphere was appropriately adjusted.

Each glass-free sintered layer serving as an outer electrode was subjected to nickel plating and tin plating to complete a multilayer ceramic capacitor serving as a sample.

For the multilayer ceramic capacitors of samples 1 to 5 obtained as described above, as presented in Table 1, "Adhesion of outer electrode" was evaluated. More specifically, "Connection to inner electrode" and "Adhesion to ceramic body" were evaluated, and "Sintering in outer electrode" was also evaluated in order to check the shape retainability of the outer electrodes. These evaluations were performed by processing the multilayer ceramic capacitor samples to provide cross sections using an ion milling apparatus, observing the state of voids with an FE-SEM, and observing the distribution state of elements with an EDX.

Regarding "Connection to inner electrode", for 10 specimens, "○" was given when nickel in the inner electrodes and the metal of the outer electrodes were interdiffused in all of the specimens, and "×" was given when they were not interdiffused in at least some of the specimens. In Table 1, no sample was evaluated as "×".

Regarding "Adhesion to ceramic body", for 10 specimens, "○" was given when the ceramic bodies and the outer electrodes adhered to each other in all of the specimens, and "×" was given when the ceramic bodies and the outer electrode did not adhere to each other in at least some of the specimens. In Table 1, no sample was evaluated as "×".

Regarding "Sintering in outer electrode", for 10 specimens, "○" was given when the conductive metal powder in the outer electrodes was sintered in all the specimens, and "×" was given when the conductive metal powder was not sintered in at least some of the specimens. In Table 1, no sample was evaluated as "×".

A moisture resistance load test was conducted on samples 1 to 5 by applying a voltage of about 50 V to the samples for about 144 hours at a temperature of about 125° C. and a relative humidity of about 95% to evaluate "Moisture resistance load reliability". Regarding "Moisture resistance load reliability", "○" was given when the insulation resistance did not decrease, and "×" was given when the insulation resistance decreased. In Table 1, no sample was evaluated as "×".

Samples 1 to 5 in Table 1 are within the scope of the present invention. These samples 1 to 5 are evaluated as "○" for all the items given in Table 1: "Connection to inner electrode", "Adhesion to ceramic body", "Sintering in outer electrode", and "Moisture resistance load reliability".

Although the multilayer ceramic capacitors have been described above as examples of the ceramic electronic chip components according to preferred embodiments of the present invention, the present invention can be applied to other ceramic electronic chip components as long as they include outer electrodes formed with conductive pastes.

It should be noted that each preferred embodiment described in the present specification is illustrative, and the components in the different preferred embodiments may be partially replaced or combined.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method for manufacturing a ceramic electronic chip component that includes a ceramic body including an inner conductor and a portion of the inner conductor exposed on a surface of the ceramic body, and an outer electrode electrically coupled to the inner conductor and covering a portion of the surface of the ceramic body, the method comprising:

providing the ceramic body;
providing a conductive paste to be formed into at least a portion of the outer electrode;
applying the conductive paste to cover a portion of the surface of the ceramic body; and
performing heat treatment of the ceramic body to which the conductive paste has been applied; wherein
the outer electrode includes a first glass-free sintered layer containing no glass;
the providing the conductive paste includes providing a first glass-free conductive paste including a first conductive metal powder and a first thermosetting resin, the first conductive metal powder including an alloy of tin and at least one of copper and nickel, and the first glass-free conductive paste containing no glass;
the applying the conductive paste includes applying the first glass-free conductive paste to cover a portion of the surface of the ceramic body; and
the performing heat treatment of the ceramic body includes performing heat treatment of the ceramic body to which the first glass-free conductive paste has been applied at a first temperature higher than or equal to a temperature about 400° C. higher than a curing temperature of the first thermosetting resin to form the first glass-free sintered layer.

2. The method according to claim 1, wherein the alloy has a tin content of about 2% or more by mass and about 15% or less by mass.

3. The method according to claim 1, further comprising after the performing heat treatment of the ceramic body, sequentially forming a nickel plating film and a tin plating film that cover the outer electrode.

4. The method according to claim 1, wherein the performing heat treatment includes, in the first glass-free sintered layer, subjecting the first thermosetting resin to thermal decomposition or subjecting the first thermosetting resin to combustion.

5. The method according to claim 1, wherein in the performing heat treatment of the ceramic body, the temperature about 400° C. higher than the curing temperature of the first thermosetting resin is about 580° C.

6. The method according to claim 1, wherein
the outer electrode further includes a second glass-free sintered layer on the first glass-free sintered layer, the second glass-free sintered layer containing no glass;
the providing the conductive paste further includes providing a second glass-free conductive paste including a second conductive metal powder and a second thermosetting resin, the second conductive metal powder including an alloy of tin and at least one of copper and nickel, and the second glass-free conductive paste containing no glass;
the applying the conductive paste further includes applying the second glass-free conductive paste onto the first glass-free sintered layer; and
the performing heat treatment of the ceramic body further includes performing heat treatment of the ceramic body to which the second glass-free conductive paste has been applied at a second temperature that is higher than or equal to a temperature about 400° C. higher than a curing temperature of the second thermosetting resin and that is lower than the first temperature to form the first glass-free sintered layer.

7. The method according to claim 6, wherein the second glass-free conductive paste has a composition identical to that of the first glass-free conductive paste.

8. The method according to claim 1, wherein
the outer electrode further includes a resin-containing conductive layer;
the providing the conductive paste further includes providing a third glass-free conductive paste including a conductive metal powder and a thermosetting resin, the third glass-free conductive paste containing no glass;
the applying the conductive paste further includes applying the third glass-free conductive paste to cover the first glass-free sintered layer; and
the performing heat treatment of the ceramic body further includes heat-curing the thermosetting resin in the third glass-free conductive paste.

9. The method according to claim 1, wherein the applying the conductive paste includes applying the first glass-free conductive paste onto the surface of the ceramic body while the first glass-free conductive paste is in contact with the inner conductor.

10. A method for manufacturing a ceramic electronic chip component that includes a ceramic body including an inner conductor and a portion of the inner conductor exposed on a surface of the ceramic body, and an outer electrode electrically coupled to the inner conductor and covering a portion of the surface of the ceramic body, the method comprising:
providing the ceramic body;
providing a conductive paste to be formed into at least a portion of the outer electrode;
applying the conductive paste to cover a portion of the surface of the ceramic body; and
performing heat treatment of the ceramic body to which the conductive paste has been applied; wherein
the outer electrode includes a first glass-free sintered layer containing no glass;
the providing the conductive paste includes providing a first glass-free conductive paste including a first conductive metal powder and a first thermosetting resin, the first conductive metal powder including an alloy of tin and at least one of copper and nickel, and the first glass-free conductive paste containing no glass;
the applying the conductive paste includes applying the first glass-free conductive paste to cover a portion of the surface of the ceramic body;
the performing heat treatment of the ceramic body includes performing heat treatment of the ceramic body to which the first glass-free conductive paste has been applied at a first temperature higher than or equal to a temperature about 400° C. higher than a curing temperature of the first thermosetting resin to form the first glass-free sintered layer;
the outer electrode further includes a glass-containing sintered layer including a glass;
the providing the conductive paste further includes providing a glass-containing conductive paste including a conductive metal powder and a glass;
the applying the conductive paste further includes applying the glass-containing conductive paste onto the surface of the ceramic body while the glass-containing conductive paste is in contact with the inner conductor;
the performing heat treatment of the ceramic body further includes performing heat treatment of the ceramic body to which the glass-containing conductive paste has been applied to form the glass-containing sintered layer; and
the applying the first glass-free conductive paste includes applying the first glass-free conductive paste onto the glass-containing sintered layer.

11. The method according to claim 1, wherein the alloy of tin and at least one of copper and nickel includes a copper·tin alloy powder, a nickel·tin alloy powder, or a copper·nickel·tin alloy powder, or a powder mixture of at least two of the copper·tin alloy powder, the nickel·tin alloy powder, or the copper·nickel·tin alloy powder.

12. The method according to claim 1, wherein particles of the first conductive metal powder are spherical or plate-shaped.

13. The method according to claim 1, wherein particles of the first conductive metal powder have a particle size of about 0.1 μm to about 1.0 μm in terms of D50 measured by a laser diffraction/scattering method.

* * * * *